July 5, 1966 W. F. BARTLETT ETAL 3,259,696

TRIPLE TRANSFER TIME DIVISION MULTIPLEX COMMUNICATION SYSTEM

Filed March 26, 1963

INVENTORS.
*WILLIAM F. BARTLETT*
*KOHO OZONE*
*RICHARD SCOTT*
BY George J. Seligsohn
*ATTORNEY*

United States Patent Office 3,259,696
Patented July 5, 1966

3,259,696
TRIPLE TRANSFER TIME DIVISION MULTIPLEX COMMUNICATION SYSTEM

William F. Bartlett, Rochester, Koho Ozone, Webster, and Richard Scott, Pittsford, N.Y., assignors, by mesne assignments, to Stromberg-Carlson Corporation, Rochester, N.Y., a corporation of Delaware Filed Mar. 26, 1963, Ser. No. 268,010
3 Claims. (Cl. 179—15)

This invention relates to a time division multiplex communication system and, more particularly, to such a system utilizing triple energy transfer switching and which includes only a single common speech storage unit.

Reference is made to copending patent application Serial No. 45,312, filed July 26, 1960, now Patent No. 3,134,858, for an Automatic Communication Sytem, by William F. Bartlett et al., and assigned to the same assignee as this application. In the automatic communication system disclosed in patent application Serial No. 45,312, a plurality of individual calls may be extended between different line circuits or between any line circuit and a trunk circuit by the use of time division multiplex techniques.

Briefly, the automatic communication system disclosed in patent application Serial No. 45,312 operates in the following manner:

Each individual line and trunk circuit is pre-assigned its own individual identification number. When a calling party initiates a call over a particular one of the line circuits, that line circuit is allotted a free time slot in a repetitive time frame and the identity number of this calling line circuit is stored in the time slot allotted thereto in a calling line store composed of recirculating delay lines.

In response to the calling party dialing the identity number of the called or terminating line circuit, the called or terminating line identity number is stored in the time slot allotted to the calling line circuit in the terminating line store which is also composed of recirculating delay lines.

Thus, it will be seen that once each time frame, in the time slot allotted to the calling line circuit, the identity number of the calling line circuit will appear at the output of the calling line store, while simultaneously the identity number of the called or terminating line will appear at the output of the terminating line store. The output of the calling line store is applied as an input to a calling line matrix and the output of the terminating line store is applied as an input to the terminating line matrix. The calling line matrix, in response to the calling line identity number information being applied thereto from the calling line store, applies a pulse to an individual normally closed line gate connecting the calling line circuit to a common transmission highway, while simultaneously the terminating line matrix, in response to the called or terminating line identity number information being applied theerto from the terminating line store, applies a pulse to an individual normally closed line gate connecting the called or terminating line circuit to the common transmission highway. Therefore, only during the individual time slot allotted to the calling line circuit of each time frame are the calling line circuit and the called or terminating line circuit connected to each other by the common transmission highway. In a similar manner other line circuits will be connected to each other during other different time slots in each time frame.

Each time slot is preferably composed of an "on" time portion, during which the calling line circuit and called or terminating line circuit are connected to each other by the common transmission highway, followed by a guard time portion, during which the common transmission highway is clamped to a fixed potential. The reason for clamping tthe common transmission highway is to prevent cross-talk between a call utilizing one particular time slot and a different call utilizing the next subsequent time slot in the time frame.

Although the time division multiplex system disclosed in patent application Serial No. 45,312, and briefly described above, operates quite satisfactory, it will be seen that since calling line information and called or terminating line information are applied to the common transmission highway simultaneously, it is necessary to provide a separate calling line store and a separate terminating line store as well as a separate calling line matrix and a separate terminating line matrix. This duplication of line stores and line matrices is unduly expensive.

It is therefore an object of the present invention to provide a time division multiplex system utilizing a single line store and a single matrix for controlling both the application of information from the calling line circuit and the called or terminating line circuit to the common transmission highway.

It is a further object of this invention to provide a single common information signal storage unit connected to the common transmission highway so that the calling line circuit and called or terminating line circuit may be connected to the common transmission highway successively rather than simultaneously.

These and other objects, features and advantages of the present invention will become more apparent from the following detailed description taken together with the accompanying drawing, in which.

Briefly, in the present invention each time slot period is divided into at least three, and preferably four, sub-slot periods. The calling and called line gates are not operated simultaneously, as in the system disclosed in patent application Serial No. 45,312, but are operated successively. More particularly, the calling line gate is preferably operated twice during its time slot period, once during the first-occurring sub-slot of its time slot period and again during the third-occurring sub-slot of its time slot period. The called gate is operated during the second-occurring sub-slot of its time slot period. However, the respective sub-slot periods during which the calling gate and called gate operate may be interchanged, i.e., the called gate may be operated during the first and third-occurring sub-slots of its time slot period and the calling gate may be operated during the second sub-slot of its time slot period. Since it is highly desirable to clamp the transmission highway between successive time slot periods, the common transmission highway may be clamped to a fixed potential during a fourth-occurring sub-slot of each time slot period in each time frame.

Figure 1:
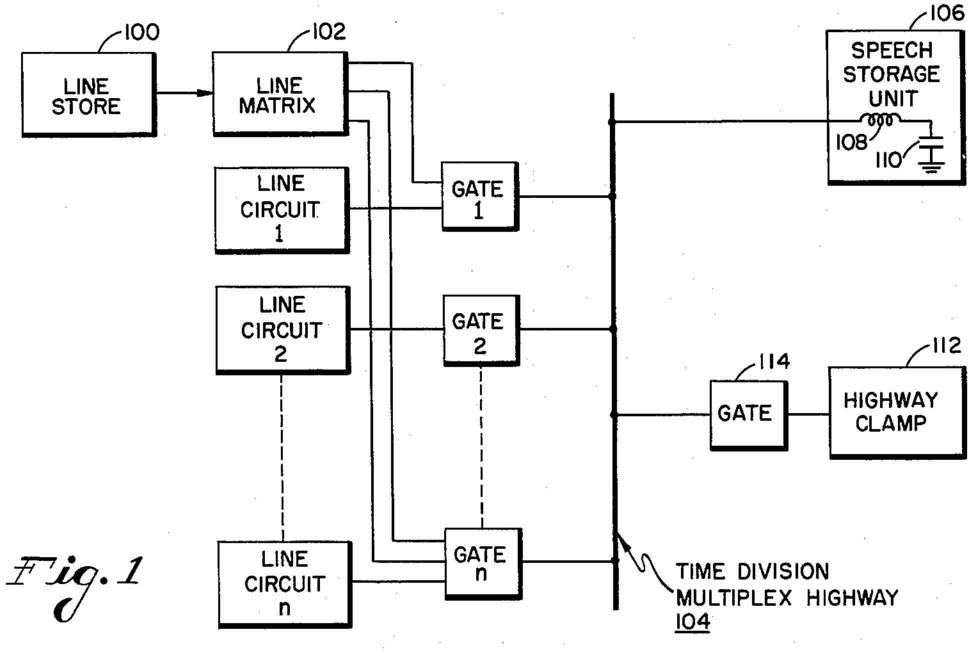
FIG. 1 is a block diagram of a preferred embodiment of the invention.

Referring now to FIG. 1 there is shown line store 100 which is substantially identical to the calling and terminating line stores described in patent application Serial No. 45,312. Line store 100 is composed of a plurality of recirculating delay lines providing a predetermined number of time slot periods each of which is further broken down into four successive sub-slot periods. The identity number of any calling line circuit is stored both in the first and third-occurring sub-slots of its allotted time slot period and the identity number of a line circuit called by such calling line circuit is stored in the second-occurring sub-slot of the time slot period allotted to that calling line circuit. Thus, during each time frame the identity number of the calling line circuit will appear at the output of line store 100 during the first-occurring sub-slot of a particular time slot, immediately followed by the identity number of the corresponding called line circuit appearing at the output of line store 100 during the second-occurring sub-slot of this particular time slot, and then immediately followed by a second appearance of the identity number of the calling line circuit at the output of line store 100 during the third-occurring sub-lot of this particular time slot.

The output of line store 100 is applied as an input to line matrix 102, the line matrix 102, which is substantially identical to the calling or terminating line matrix disclosed in patent application Serial No. 45,312, includes a plurality of gates, each of which is distinctively operated by a different identity number applied thereto from line store 100.

As shown, a plurality of line circuits, such as line circuit 1, line circuit 2 . . . line circuit *n* are respectively connected to a common time division multiplex transmission highway 104 through individual normally closed line gates, such as gate 1, gate 2 . . . gate *n*, respectively.

Each of these gates is individually controlled by a separate output from line matrix 102, which output is energized in response to the identity number of the line circuit and gate with which it is associated, being applied from line store 100 to line matrix 102.

When one of the line gates such as gate 1, gate 2 . . . gate *n* is opened, information from its corresponding line circuit is transferred from the line circuit with which it is associated, over the highway 104 to speech storage unit 106, which comprises inductance 108 and capacitance 110, and between speech storage unit 106 and the line circuit associated with the open line gate.

A fixed potential from highway clamp 112 is applied to highway 104 in response to the opening of normally closed gate 114.

Figure 2:
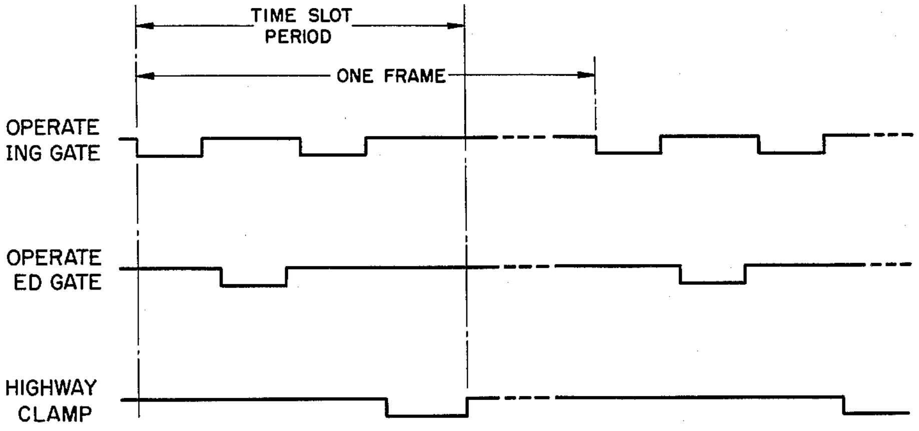
FIG. 2 is a timing diagram showing the relative timing of the "on" portions of a calling line gate, called line gate and the highway clamp, respectively in the embodiment shown in FIG. 1.

Referring now to FIG. 2, as shown, a time slot period in each frame is composed of four sub-slots, a calling gate being operated during the first and third-occurring sub-slots of any time slot period in the time frame, the called gate being operated during the second-occurring sub-slot of any time slot period in the time frame, and the highway clamp being operated during the fourth-occurring sub-slot in each time slot period of the time frame.

Therefore, assuming for illustrative purposes that line circuit 1 is the calling line circuit and line circuit 2 is the called line circuit, then the identity number of line circuit 1 will be stored in line store 100 in the first and third-occurring sub-slots of the time slot period allotted to line circuit 1 and the identity number of line circuit 2 will be stored in line store 100 in the second-occurring sub-slot of the time slot period allotted to line circuit 1. Therefore, during each time frame when the first-occurring sub-slot of the time slot period allotted to line circuit 1 reaches the output of line store 100, gate 1 will be opened and information from line circuit 1 will be transferred to speech storage unit 106, where this information will be stored. Since speech storage unit 106 has no previous information stored thereon, no information will be transmitted back to the line circuit 1 from speech storage unit 106 during the first-occurring sub-slot of the time slot period allotted to line circuit 1. During the second-occurring sub-slot of the time slot period allotted to line circuit 1, gate 2 will be opened permitting the information stored by speech storage unit 106 to be transmitted to line circuit 2 and simultaneously thereto, information from line circuit 2 to be transferred to and stored by speech storage unit 106. When the third-occurring sub-slot of the time slot period allotted to line circuit 1 occurs, gate 1 will again be opened and the information from line circuit 2 stored by speech storage unit 106 will be transferred to line circuit 1. Since there has been substantially no change in information on line circuit 1 in the tiny interval between the first and third-occurring sub-slots no new information is transferred at this time from line circuit 1 to speech storage unit 106.

It will be seen from the above discussion that immediately after the third-occurring sub-slot of the time slot period allotted to line circuit 1, the information in line circuit 1 has been transferred to line circuit 2 and the information in line circuit 2 has been transferred to line circuit 1. However, there may be a slight residue of this information still present on highway 104 and in speech storage unit 106. To prevent this residue from causing cross-talk with the call occupying the next occurring time slot period, gate 114 is opened during the fourth-occurring sub-slot, permitting highway clamp 112 to bring highway 104 and speech storage 106 to a point of fixed potential, thereby removing any residue of information that might have been present on highway 104 and speech storage unit 106.

From the foregoing description it will be apparent that the present invention needs only a single line store and a single line matrix to control the transfer of information between any two line circuits of a time division multiplex communication system, rather than needing the two separate line stores and the two separate line matrices which were formerly required.

Although only a preferred embodiment of the invention has been described in detail, it is not intended that the invention be restricted thereto, but that it be limited only by the true spirit and scope of the appended claims.

What is claimed is:

1. In a time division communication system in which a predetermined number of distinct time slots occur successively in a repetitive time frame, each distinct time slot being composed of at least three successively occurring sub-slots, the combination comprising a plurality of individual communication line circuits, a common transmission highway, respective normally closed line gates each individually connecting a different one of said line circuits to said highway, an information signal storage means directly connected to said highway, and control means for extending a communication connection between any two of said line circuits, said control means including means for opening that line gate individually connected to one of said two line circuits during the first and third-occurring sub-slots of a particular time slot each time frame and means for opening that line gate individually connected to the other of said two line circuits during the second-occurring sub-slot of said particular time slot each time frame.

2. The combination defined in claim 1, wherein each distinct time slot includes four successively occurring sub-slots, and further including means for clamping said highway to a fixed potential during the fourth-occurring sub-slot of each time slot in each time frame.

3. The combination defined in claim 1, wherein said information signal storage means includes an inductance and a capacitance connected in series between said highway and a point of fixed potential.

References Cited by the Examiner

UNITED STATES PATENTS 2,962,552 11/1960 Crowley ............ 179—15

DAVID G. REDINBAUGH, *Primary Examiner.*

R. L. GRIFFIN, *Assistant Examiner.*